United States Patent [19]
King

[11] Patent Number: 4,897,203
[45] Date of Patent: * Jan. 30, 1990

[54] PROCESS AND APPARATUS FOR RECOVERY AND RECYCLING CONVEYOR LUBRICANTS

[75] Inventor: William J. King, Orange, Calif.

[73] Assignee: Pure-Chem Products, Inc., Stanton, Calif.

[*] Notice: The portion of the term of this patent subsequent to Jan. 30, 2007 has been disclaimed.

[21] Appl. No.: 161,000

[22] Filed: Feb. 26, 1988

[51] Int. Cl.$^4$ ............................................. C02F 1/00
[52] U.S. Cl. ........................... 210/754; 210/764; 210/765; 210/766; 210/167; 210/177; 210/199; 210/203; 210/805; 198/495; 198/500; 422/1; 134/10; 134/21; 134/109
[58] Field of Search ............. 210/177, 181, 182, 765, 210/805, 806, 167, 168, 199, 203, 764, 766, 758, 754; 422/1; 198/495, 500; 134/108, 110, 124, 131, 10, 109, 21; 15/306 A, 306 R

[56] References Cited

U.S. PATENT DOCUMENTS

| | | | |
|---|---|---|---|
| 579,385 | 3/1897 | Dodge | 184/15.1 |
| 883,536 | 3/1908 | Gessner | 34/82 |
| 1,014,248 | 1/1912 | Mueller | 184/15.1 |
| 1,196,438 | 8/1916 | Doyle et al. | 101/425 |
| 1,245,605 | 11/1917 | Lucas | 210/758 |
| 1,560,286 | 11/1925 | Mount | 55/42 |
| 1,926,306 | 9/1933 | Pettersen | 15/306 A |
| 1,954,800 | 4/1934 | Palmerton et al. | 162/161 |
| 2,003,397 | 6/1935 | Smith | 15/306 A |
| 2,082,411 | 6/1937 | Merrill | 15/306 A |
| 2,095,471 | 10/1937 | Hayward | 34/160 |
| 2,103,966 | 12/1937 | Behan | 68/18 F |
| 2,142,711 | 1/1939 | Birch | 15/306 A |
| 2,234,153 | 3/1941 | Herbert | 72/39 |
| 2,245,109 | 6/1941 | Lapeyrouse | 162/247 |
| 2,367,354 | 1/1945 | Kanter | 198/500 |
| 2,495,937 | 1/1950 | Lawlor | 210/758 |
| 2,532,910 | 12/1950 | Hayward | 34/68 |
| 2,541,301 | 2/1951 | Sissler | 15/256.5 |
| 2,548,739 | 4/1951 | Peck | 198/500 |
| 2,597,801 | 5/1952 | Jellinek | 15/306 A |
| 2,604,199 | 7/1952 | Govan | 184/17 |
| 2,668,796 | 2/1954 | Wehmiller et al. | 210/785 |
| 2,670,069 | 2/1954 | Dobkin | 184/17 |
| 2,677,197 | 5/1954 | Lindgren | 34/115 |
| 2,719,529 | 10/1955 | Wells | 134/144 |
| 2,788,540 | 4/1957 | Snape | 15/306 A |
| 2,859,537 | 11/1958 | Shockey | 34/85 |
| 2,872,415 | 2/1959 | Schiever et al. | 210/750 |
| 2,875,846 | 3/1959 | Yonkers | 55/290 |
| 2,885,068 | 5/1959 | Bishop | 198/495 |
| 2,885,069 | 5/1959 | Bowen | 198/494 |
| 2,893,043 | 7/1959 | Charlton et al. | 15/306 A |
| 2,901,394 | 8/1959 | Wilmington | 514/568 |
| 2,908,355 | 10/1959 | Moore | 184/15.1 |
| 2,956,300 | 10/1960 | Bruno | 15/306 A |
| 2,956,301 | 10/1960 | Bruno | 15/306 A |
| 3,023,848 | 3/1962 | Osterman | 184/15.1 |
| 3,045,273 | 7/1962 | Bruno | 15/306 A |
| 3,053,371 | 9/1962 | Fischer | 198/500 |
| 3,060,482 | 10/1962 | Doyle | 15/306 A |
| 3,067,837 | 12/1962 | Burrows | 184/15.1 |
| 3,079,285 | 2/1963 | Rockwell | 134/10 |
| 3,082,146 | 3/1963 | Wentworth et al. | 162/161 |
| 3,103,030 | 9/1963 | Sands | 15/306 A |
| 3,113,351 | 12/1963 | Naegeli | 19/263 |
| 3,119,140 | 1/1964 | Sallet | 15/306 A |
| 3,145,409 | 8/1964 | Davey et al. | 15/306 A |
| 3,151,064 | 9/1964 | Lathrop | 210/758 |
| 3,170,314 | 2/1965 | Worst | 68/12 R |
| 3,192,155 | 6/1965 | Bready et al. | 210/705 |
| 3,252,177 | 5/1966 | Alexeff | 15/306 A |

(List continued on next page.)

Primary Examiner—W. Gary Jones
Assistant Examiner—Matthew O. Savage
Attorney, Agent, or Firm—Jackson & Jones

[57] ABSTRACT

A solution of water soluble conveyor lubricant is continuously recovered from a moving conveyor through a suction bar. The lubricant is treated to reduce suspended solids, heat sterilized, the pH adjusted, and a bactericide is added. The solution is then recycled at least once to obtain about a 50%–90% recovery, and then is discharged. The process saves a significant amount of water, in addition to lubricant.

14 Claims, 1 Drawing Sheet

U.S. PATENT DOCUMENTS

| | | | |
|---|---|---|---|
| 3,264,173 | 8/1966 | Frick | 162/274 |
| 3,267,970 | 8/1966 | Maguire et al. | 139/1 C |
| 3,272,651 | 9/1966 | Quirk | 134/21 |
| 3,295,339 | 1/1967 | Cheyne | 68/18 F |
| 3,298,904 | 1/1967 | Compte et al. | 162/274 |
| 3,328,294 | 6/1967 | Self et al. | 210/744 |
| 3,358,315 | 12/1967 | Bennett | 15/306 R |
| 3,420,654 | 1/1969 | Cannon et al. | 71/67 |
| 3,453,681 | 7/1969 | Wiederhold | 15/306 A |
| 3,462,363 | 8/1969 | Mills | 210/668 |
| 3,469,275 | 9/1969 | Deschutters et al. | 15/306 R |
| 3,510,433 | 5/1970 | Pasowicz | 252/180 |
| 3,514,278 | 5/1970 | Brink | 71/67 |
| 3,546,114 | 12/1970 | Dietz et al. | 210/760 |
| 3,554,323 | 1/1971 | Wheelock | 184/15.1 |
| 3,568,238 | 3/1971 | Fischer | 15/306 B |
| 3,574,261 | 4/1971 | Bailey | 34/23 |
| 3,576,234 | 4/1971 | Batchelor | 184/15.1 |
| 3,618,713 | 11/1971 | Batchelor | 184/15.1 |
| 3,647,703 | 3/1972 | Shema et al. | 252/180 |
| 3,654,659 | 4/1972 | Blumenthal | 15/306 A |
| 3,659,096 | 4/1972 | Kompanek | 422/24 |
| 3,664,821 | 5/1972 | Shema et al. | 71/67 |
| 3,690,860 | 9/1972 | Salutsky et al. | 71/67 |
| 3,739,605 | 6/1973 | Baker | 68/20 |
| 3,751,756 | 8/1973 | Arnett, Jr. | 15/306 A |
| 3,775,806 | 12/1973 | Olbrant et al. | 15/306 A |
| 3,837,800 | 9/1974 | Wood | 422/24 |
| 3,841,910 | 10/1974 | Baker | 134/15 |
| 3,848,290 | 11/1974 | Bates | 15/321 |
| 3,859,163 | 1/1975 | Haythorn | 162/198 |
| 3,871,982 | 3/1975 | Idstein | 204/207 |
| 3,882,568 | 5/1975 | Hill | 15/308 |
| 3,885,272 | 5/1975 | Marzoli | 19/245 |
| 3,897,562 | 7/1975 | Shema et al. | 514/528 |
| 3,909,873 | 10/1972 | Minasov et al. | 15/306 B |
| 3,915,857 | 10/1975 | Olson | 210/668 |
| 3,919,729 | 11/1975 | Cannan | 8/58 |
| 3,956,790 | 5/1976 | Ishiwata et al. | 15/302 |
| 3,959,843 | 6/1976 | Yokota et al. | 15/306 A |
| 3,962,456 | 6/1976 | Swered et al. | 514/640 |
| 3,973,987 | 8/1976 | Hewitt et al. | 134/12 |
| 3,974,540 | 8/1976 | Bonner | 15/306 A |
| 3,974,541 | 8/1976 | Silvis et al. | 15/320 |
| 4,010,514 | 3/1977 | Fischer et al. | 15/306 A |
| 4,011,623 | 3/1977 | Pabst et al. | 15/306 A |
| 4,014,065 | 3/1977 | Hudson | 15/306 R |
| 4,026,701 | 5/1977 | Till et al. | 430/125 |
| 4,061,504 | 12/1977 | Zall et al. | 134/95 |
| 4,116,762 | 9/1978 | Gardiner | 162/199 |
| 4,159,579 | 7/1979 | Hoddinott et al. | 34/155 |
| 4,166,368 | 9/1979 | Beninca et al. | 68/20 |
| 4,189,046 | 2/1980 | Ward et al. | 198/499 |
| 4,202,437 | 5/1980 | Gordon | 198/497 |
| 4,208,283 | 6/1980 | Brouzes | 210/754 |
| 4,225,431 | 9/1980 | De Longe | 210/617 |
| 4,231,133 | 11/1980 | Probost | 15/300 A |
| 4,251,895 | 2/1981 | Caridis | 15/3.13 |
| 4,261,760 | 4/1981 | Kandel | 134/15 |
| 4,262,776 | 4/1981 | Wilson et al. | 184/15 R |
| 4,274,973 | 6/1981 | Stanton et al. | 252/34.7 |
| 4,277,343 | 7/1981 | Paz | 210/614 |
| 4,278,497 | 7/1981 | Mellen | 162/252 |
| 4,280,869 | 7/1981 | Eckerdt | 162/252 |
| 4,290,520 | 9/1981 | Rhodes | 198/499 |
| 4,308,077 | 12/1981 | Bolton | 134/15 |
| 4,314,906 | 2/1982 | Dunn et al. | 210/754 |
| 4,324,327 | 4/1982 | Chouteau | 198/497 |
| 4,329,201 | 5/1982 | Bolton | 162/198 |
| 4,337,269 | 6/1982 | Berke et al. | 514/494 |
| 4,359,150 | 11/1982 | Bowman et al. | 198/497 |
| 4,441,340 | 4/1984 | Kaplan | 68/12 R |
| 4,447,924 | 5/1984 | Bolton et al. | 8/151 |
| 4,450,080 | 5/1984 | Dodd | 210/391 |
| 4,454,621 | 6/1984 | Testone | 15/1.5 R |
| 4,455,706 | 6/1984 | Volkmann et al. | 15/306 A |
| 4,477,287 | 10/1984 | Kush et al. | 134/15 |
| 4,489,823 | 12/1984 | Gordon | 198/499 |
| 4,498,577 | 2/1985 | Veenhof | 198/499 |
| 4,520,528 | 6/1985 | Grof | 15/304 |
| 4,522,488 | 6/1985 | Fisher | 355/15 |
| 4,533,035 | 8/1985 | Reiter | 198/499 |
| 4,590,646 | 5/1986 | Gasser | 19/262 |
| 4,594,748 | 6/1986 | Warvinge | 15/308 |
| 4,616,377 | 10/1986 | Urbani | 15/302 |
| 4,633,999 | 1/1987 | Perneczky | 198/499 |
| 4,672,711 | 6/1987 | Mickler | 8/151 |
| 4,724,079 | 2/1988 | Sale et al. | 210/638 |
| 4,727,614 | 3/1988 | Swistun | 15/1.5 R |
| 4,733,526 | 9/1988 | Slikker | 60/32.02 |
| 4,768,644 | 9/1988 | Cromm | 198/499 |
| 4,779,716 | 10/1988 | Gordon | 198/497 |
| 4,783,947 | 11/1988 | Posey et al. | 53/167 |
| 4,787,500 | 11/1988 | Holz | 198/497 |

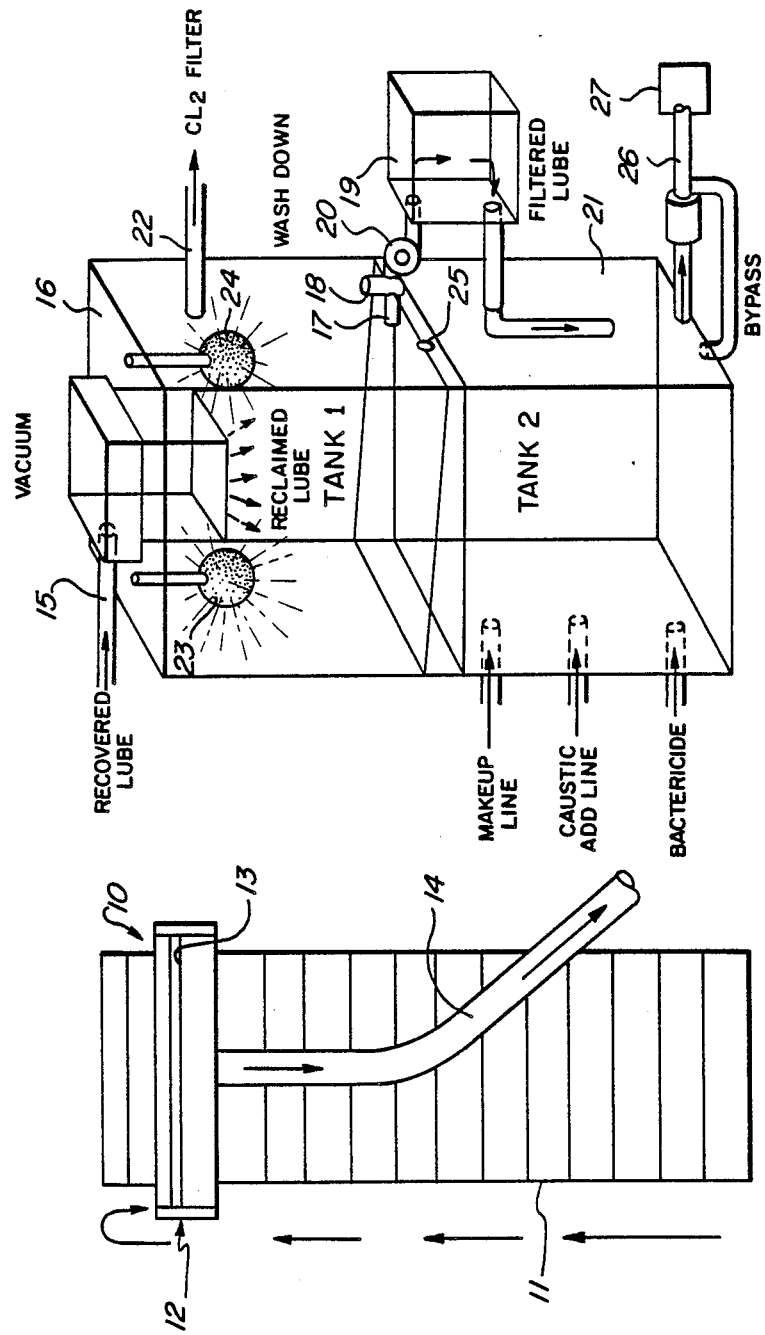

4,897,203

PROCESS AND APPARATUS FOR RECOVERY AND RECYCLING CONVEYOR LUBRICANTS

BACKGROUND OF THE INVENTION

This invention relates to a new and improved process and apparatus for recovering, treating and recycling a solution of water soluble conveyor chain lubricating soap and/or detergent from conveyor lines and is a continuation in part of my previous U.S. patent application, Ser. No. 148288 filed Jan. 1, 1988. The invention is suitable for use in bottling plants such as those in the soft drink, beverage and beer industries, in food canning plants, and in the dairy industry.

Presently, these type of plants employ a solution of soap a single time only, and then discharge the soap solution to a sewage line. This process not only consumes water, which is obviously in short supply, and hence expensive, but it also taxes the capacity of existing sewage systems. Consequently, many bottlers now pay very large sewer tax fees, based on effluent content, for sewer line use. In addition, the solution of soap and foam which is discharged onto the work floor is slippery and presents a worker hazard, and also, the soap may eventually erode the floor itself. Typically, a large bottling facility may use 5,000-10,000 gallons of water per day and say, about 75 gallons of soap.

Obviously, a recovery process and system is desired which will reduce the use of both water and soap, and also reduce or eliminate the generation of foam. Sewage use also will be reduced.

Preferably, the process and system should be simple and inexpensive, and easy to install, operate and service.

THE INVENTION

According to the invention, a recovery process and system are provided for continuously collecting and recycling a solution of water soluble, chain lubricating soaps and/or detergents from a conveyor line while defoaming the solution.

Prior to recycling, or during the recycling operation, the soap solution is treated to maintain its function, after which the solution is recycled to the conveyor line.

Typically, a suction means operated by a vacuum, pump, venturi, etc., is positioned on the underside of the conveyor line to remove the relatively thin film of water solution of soap and/or detergent from the conveyor and simultaneously defoam the solution.

The solution is then fed to treating tanks for pH adjustment with caustic, bactericide treatment, and then recycled to the conveyor line for reuse. After a period of reuse, i.e., when the solution becomes dirty, it is chlorinated, filtered and then discharged to sewage, and a fresh batch of soap solution is added. It is estimated that a 50%-90% recovery can be obtained by the process and system of this invention. Thus, for a normal 10,000 gallon of effluent discharge/day, a 90% recovery would obtain a 365,000 gallon/year effluent discharge compared to the usual 3,650,000 gallon/year of effluent discharge. A 50% recovery would obtain a 1,825,000 gallon/year effluent discharge. In both cases, a considerable saving could be realized in water costs, soap costs, sewer charges, and would reduce problems due to foam. It would also facilitate treatment of effluent to reduce the levels of biological oxygen demand in the sewage.

BRIEF DESCRIPTION OF THE DRAWINGS

FIG. 1 is a diagrammatic bottom plan view of the apparatus of this invention showing the suction means for removing and defoaming soap solution from a conveyor; and, FIG. 2 is a schematic, perspective view showing the treating and recycling portion of the apparatus.

DESCRIPTION OF THE PREFERRED EMBODIMENTS

The recovery apparatus 10 of this invention is shown in FIG. 1 mounted on a moving conveyor 11 which has been sprayed with a water soluble lubricating soap and/or detergent, such as a potassium-tall oil soap. The recovery apparatus is usually mounted under the conveyor and transversely to the direction of the conveyor movement. Preferably, the recovery unit is positioned at or near the dump side of the conveyor, i.e., just after the conveyor changes direction from the upper to the lower side.

The recovery apparatus includes a suction bar 12 defining a suction slit 13 and powered by a suction means (not shown) such as a vacuum, pump, venturi, etc., through a suction line 14, and then to a recovery and treating unit, which will be described, infra.

Typically, the liquid portion of the film containing soap on the conveyor is about $1/20''-\frac{1}{2}''$ thick, and may vary from 1 mil-500 mils. Usually, the film is about $1/20''-1/5''$ thick. Typically, about 50-200 parts of water to 1 part by weight of soap are used, and defoaming is easily accomplished. A water/soap ratio varying from a 1:1 water content in soap concentrate to about a water/soap ratio of about 2000:1 is estimated to be useful.

As shown in FIG. 2, the solution of recovered soap is fed to the inlet line 15 of a recovery tank 16. Underflow from the recovery tank is pumped into an outlet line 17 through a filter 18, and then to a holding tank 19 by a pump 20. Filtered soap solution from the holding tank 19 is then pumped to a treating and recycle tank 21 positioned under the recovery tank where the solution pH is adjusted with caustic (e.g. NaOH or KOH). Bactericides are also added, and make-up soap solution is added if necessary. If additional defoaming is required, isopropyl alcohol may be employed, and is added to the foam in the recovery tank; the isopropyl alcohol can be removed by heating at about 80° C., and recovered. Other defoaming agents, such as food grade defoamers, are also suitable. The treated soap solution is then recycled to the conveyor line for reuse, the entire process being adapted for continuous operation.

When the water solution of soap and/or detergent becomes too dirty, it is fed from the recovery tank 16 through an outlet line 22 to a chlorination unit (to reduce the BOD level), and it is then filtered, using say sand, diatomaceous earth, a filter cartridge, etc., and then discharged to a sewage line. Spray elements 23, 24 are used to wash the interior of the recovery tank 16. A dump valve 25 is provided to drain the tank 16 if the solution becomes excessively contaminated, thereby rendering subsequent treatment ineffective. Filtered and treated solution is returned to spray heads (not shown) in the conveyor line via a return line 26 and heat exchanger 27; its function in the process will be discussed, infra. Typical heat exchangers may employ steam, electric heaters, infra red, gas fired, radiation, etc.

EXAMPLE 1

The device of this invention was installed on a conveyor line of the Coca Cola bottling plant in Downey, Calif., one of the world's largest facility for this product. This particular plant has five conveyor lines and bottles 44,000,000 cases per year at 24 cans per case. About 7,500–10,000 gallons of soap solution are discharged daily from the conveyor lines to sewage, and this incurs a sewage use fee of about $750,000/year.

The suction bar 12 shown in FIG. 1 defines a suction slit 13 about ⅛" wide and about 24" long, to accommodate the same width of conveyor 11. A soap solution of 125 parts by weight of water containing one part by weight of a water soluble, potassium-tall oil soap was sprayed onto the stainless steel conveyor in the normal manner, and this formed a liquid film in the order of 1/10" on the conveyor, in addition to foam.

A 3½ H.P. Dayton type, wet and dry vacuum was used to remove the liquid from the underside of the conveyor without having any of the solution contact the floor. The solution was fed to a container through the suction line 14, with dimensions of about 1½" in diameter and about 2 feet in length. The operating temperature at the test site was about 60° F.–65° F. Sufficient suction force was applied to completely break the foam, and the soap solution was returned to the soap sprayers on the conveyors and reused in the normal course of operations, without any visible sign of deterioration. When using a 10–20 H.P. vacuum pump of Example 2, a suction slit width of ⅜" was employed.

EXAMPLE 2

Using the apparatus and recovery and treating unit of FIGS. 1 and 2, a 10 H.P. suction pump was employed to remove foam, soap solution and accumulated fungus growth, grease, etc., from the underside of the entire conveyor 11. The solution was recycled through the recovery and treating unit and heat exchanger 27, and then returned to the conveyor 11.

Use of the heat exchanger 27 enables the soap solution to be sterilized, and for this purpose, temperatures of about 100° F.–300° F. can be employed. Typically, a heat treatment of about 100° F.–212° F., and usually about 185° F. for say, about 2–10 minutes is suitable. If desired, bactericides and fungicides may be added to the recycled solution, however, the heat sterilization of the solution enables less bactericide, fungicide, etc., to be employed. Use of the heat exchanger 27 to sterilize the soap results in a hot soap solution being applied to the conveyor, and this improves the detergency of the soap solution.

In addition, since the recycled soap solution is continuously sterilized, and the stainless steel conveyor is continuously vacuumed, it is much easier to keep the conveyor clean.

Typically, the recycle lines and recovery and treatment unit hold about 150–200 gallons of soap solution, and the recycle volume is about 200 gallons/hour/conveyor line. The recycle efficiency is about 50%–98%. Thus for a five conveyor line plant operating two shifts/day, where discharge of soap solution occurs each hour, the amount of soap solution normally discharged would be about 16,000 gallons during a 16 hour work day. However, with the process and apparatus of this invention, at a 98% rate of recovery, the discharge would only be about 2,000 gallons/16 hours.

This represents a considerable amount of soap solution which is not discharged, and also results in a significant decrease in water consumption, soap requirements, sewage capacity (and hence sewage charges), bactericides, fungicides, etc. Also, slidge, e.g., aluminum particles, grease, fungus growth etc., is partially removed by filtering.

It will be appreciated that other types of suction inlet configurations may be used besides a single slit. For example, a series of round perforations, or small longitudinal slits, etc., are suitable. Also, it may be feasible to collect a film of the soap solution in a small drip tank positioned under the conveyor 11 and employ a suction element having a single round suction inlet to remove and defoam the soap solution.

In addition, other soaps and detergents may be used in this invention, and include synthetic detergents derived from sulfonates, phosphate esters, amides and phosphonates, metal soaps, non-ionic, cationic and anionic surfactant systems, Na and K-vegetable soaps, tall oil soaps, fatty acid soaps, etc. The soaps may be used alone or in combination with each other, where feasible.

The process and apparatus of this invention quickly defoams and removes the soap solution before it contacts the floor, and hence it can be reused in a sanitary fashion; also, the workplace is less hazardous. In addition, there is far less water consumption, and hence less sewer fees are necessary. The process of this invention enables the effluent product to be treated, thereby reducing the biological oxygen demand by treatment with $Cl_2$, $O_2$, air, or a combination thereof.

I claim:

1. A process for recovering and recycling a solution of water soluble chain lubricant or detergent from a conveyor, comprising the steps of:
   (a) continuously recovering the lubricant or detergent from the conveyor by suction means;
   (b) treating the recovered lubricant or detergent by heat sterilization;
   (c) recycling the treated lubricant or detergent to be reused to a conveyor lubricating system.

2. The process of claim 1 wherein the recovered lubricant or detergent is treated by at least one additional treatment process selected from the group consisting of filtration, pH adjustment, bactericide treatment and addition of make-up lubricant or detergent.

3. The process of claim 1, wherein the recovered lubricant or detergent which is not suitable for reuse is fed to a chlorination or oxygenation unit to reduce BOD levels and then discharged out of the process.

4. The process of claim 1, further comprising the step of defoaming the recovered lubricant or detergent prior to treatment of the recovered lubricant or detergent for reuse.

5. The process of claim 1 wherein the recovered lubricant or detergent is heat sterilized at a temperature of 100° to 300° F.

6. The process of claim 1 wherein the recovered and heat sterilized lubricant or detergent is recycled.

7. The process of claim 1, wherein the lubricant or detergent is present on the conveyor as a film having a thickness of about 1 mil–about 300 mils.

8. The process of claim 7 wherein the film has a thickness of about 1/20 inches–about ½ inches.

9. An apparatus for recovering and recycling conveyor lubricant or detergent from a moving conveyor, comprising:

(a) suction means for continuously recovering the lubricant or detergent from the conveyor;
(b) means to treat the recovered lubricant or detergent so as to render the recovered lubricant or detergent suitable for reuse which includes at least a means to heat sterilize the recovered lubricant or detergent; and
(c) means to recycle the treated lubricant or detergent to a conveyor lubricating system.

10. The apparatus of claim 9, wherein the suction means is positioned proximate the dump side of the conveyor.

11. The apparatus of claim 9, wherein the treatment means additionally comprises at least one treating device selected from the group consisting of a filter means for filtering the recovered solution, ph adjustment means, and a means for adding make-up lubricant or detergent.

12. The apparatus of claim 9, wherein the lubricant or detergent is an aqueous soap solution.

13. The apparatus of claim 12, wherein the ratio of water/soap in the recovered lubricant or detergent is about 1:1 to about 2000:1.

14. The apparatus of claim 13, wherein the water/soap weight ratio is about 50:1 to about 200:1.

* * * * *